(12) United States Patent
Glavana

(10) Patent No.: US 12,498,740 B2
(45) Date of Patent: Dec. 16, 2025

(54) APPARATUS FOR CONTROLLING POSITIVE AND NEGATIVE PRESSURE OR FLOW IN A FLUIDIC SYSTEM

(71) Applicant: FLUIGENT, Le Kremlin Bicetre (FR)

(72) Inventor: Cristian Glavana, Viroflay (FR)

(73) Assignee: FLUIGENT, Le Kremlin Bicetre (FR)

( * ) Notice: Subject to any disclaimer, the term of this patent is extended or adjusted under 35 U.S.C. 154(b) by 55 days.

(21) Appl. No.: 18/704,420

(22) PCT Filed: Oct. 24, 2022

(86) PCT No.: PCT/EP2022/079660
§ 371 (c)(1),
(2) Date: Apr. 24, 2024

(87) PCT Pub. No.: WO2023/072873
PCT Pub. Date: May 4, 2023

(65) Prior Publication Data
US 2025/0004486 A1  Jan. 2, 2025

(30) Foreign Application Priority Data

Oct. 25, 2021 (EP) ..................................... 21306481

(51) Int. Cl.
*G05D 7/06* (2006.01)
*B01L 3/00* (2006.01)
(Continued)

(52) U.S. Cl.
CPC ........ *G05D 7/0688* (2013.01); *B01L 3/50273* (2013.01); *B01L 3/502738* (2013.01);
(Continued)

(58) Field of Classification Search
CPC .......................... G05D 7/0688; G05D 16/208; B01L 3/50273; B01L 3/502738; B01L 2200/027;
(Continued)

(56) References Cited

U.S. PATENT DOCUMENTS 4,739,787 A * 4/1988 Stoltenberg ........ G05D 16/2053
137/624.11
6,957,567 B2 10/2005 Kolbe et al.
(Continued)

FOREIGN PATENT DOCUMENTS

EP      3859233 A1    8/2021
GB      2569417 A     6/2019
WO   2018184971 A1   10/2018

OTHER PUBLICATIONS

European Patent Office, Extended European Search Report Issued in Application No. 21306481.9, May 9, 2022, 9 pages.

(Continued)

*Primary Examiner* — Minh Q Le
(74) *Attorney, Agent, or Firm* — Alleman Hall & Tuttle LLP

(57) ABSTRACT

Examples are disclosed that relate to an apparatus for controlling pressure or flow in a fluidic system. The apparatus comprises a main inlet/outlet and a uni-directional pumping device configured to pump gas from an inlet of the pumping device to an outlet of the pumping device. The apparatus further comprises a valves array and a control unit. The control unit is configured to set the valves array into at least two states. In a first state, a first gas source is fluidically connected to the inlet of the pumping device, and the outlet of the pumping device is fluidically connected to the main inlet/outlet. In a second state, the main inlet/outlet is fluidically connected to the inlet of the pumping device, and the outlet of the pumping device is fluidically connected to a second gas source.

20 Claims, 8 Drawing Sheets

(51) Int. Cl.
  *G05D 16/20* (2006.01)
  *F04B 41/02* (2006.01)
  *F04B 41/06* (2006.01)
  *F04B 43/04* (2006.01)

(52) U.S. Cl.
  CPC ...... *G05D 16/208* (2013.01); *B01L 2200/027* (2013.01); *B01L 2300/14* (2013.01); *B01L 2400/0478* (2013.01); *B01L 2400/0487* (2013.01); *B01L 2400/0622* (2013.01); *F04B 41/02* (2013.01); *F04B 41/06* (2013.01); *F04B 43/046* (2013.01)

(58) Field of Classification Search
  CPC ......... B01L 2300/14; B01L 2400/0478; B01L 2400/0487; B01L 2400/0622; F04B 41/06; F04B 41/02; F04B 43/046
  USPC .................................................. 137/14, 487.5
  See application file for complete search history.

(56) References Cited

U.S. PATENT DOCUMENTS

| | | | |
|---|---|---|---|
| 7,972,561 B2 | 7/2011 | Viovy et al. | |
| 8,746,270 B2* | 6/2014 | Patterson | G05D 7/0635 |
| | | | 700/282 |
| 11,035,872 B2* | 6/2021 | Boutelle | B01L 3/502707 |
| 2006/0115382 A1* | 6/2006 | Ezaki | F15C 5/00 |
| | | | 422/400 |
| 2008/0223463 A1* | 9/2008 | Zantl | F16K 99/0001 |
| | | | 137/597 |
| 2012/0125444 A1* | 5/2012 | Tipler | G01N 30/40 |
| | | | 137/861 |
| 2013/0037119 A1* | 2/2013 | Doughty | F15B 21/047 |
| | | | 137/551 |
| 2017/0167476 A1* | 6/2017 | Bozic | F04B 11/005 |
| 2017/0284394 A1* | 10/2017 | Müller | F04C 25/02 |
| 2019/0240662 A1* | 8/2019 | Jones | B01L 3/502761 |
| 2020/0269645 A1 | 8/2020 | Reuter, II et al. | |
| 2021/0033085 A1* | 2/2021 | Adler | F04B 9/133 |
| 2024/0309892 A1* | 9/2024 | Miller | F15B 13/06 |

OTHER PUBLICATIONS

ISA European Patent Office, International Search Report and Written Opinion Issued in Application No. PCT/EP2022/079660, Feb. 24, 2023, WIPO, 12 pages.
European Patent Office, Extended European Search Report Issued in Application No. 21306481.9, May 9, 2022, Germany, 1 page.
European Patent Office, European Search Report Issued in U.S. Appl. No. 21/306,481, filed Apr. 22, 2022, Germany, 8 pages.
ISA European Patent Office, International Search Report Issued in Application No. PCT/EP2022/079660, Feb. 24, 2023, WIPO, 5 pages.
ISA European Patent Office, Written Opinion of the International Searching Authority Issued in Application No. PCT/EP2022/079660, Feb. 24, 2023, WIPO, 7 pages.

* cited by examiner

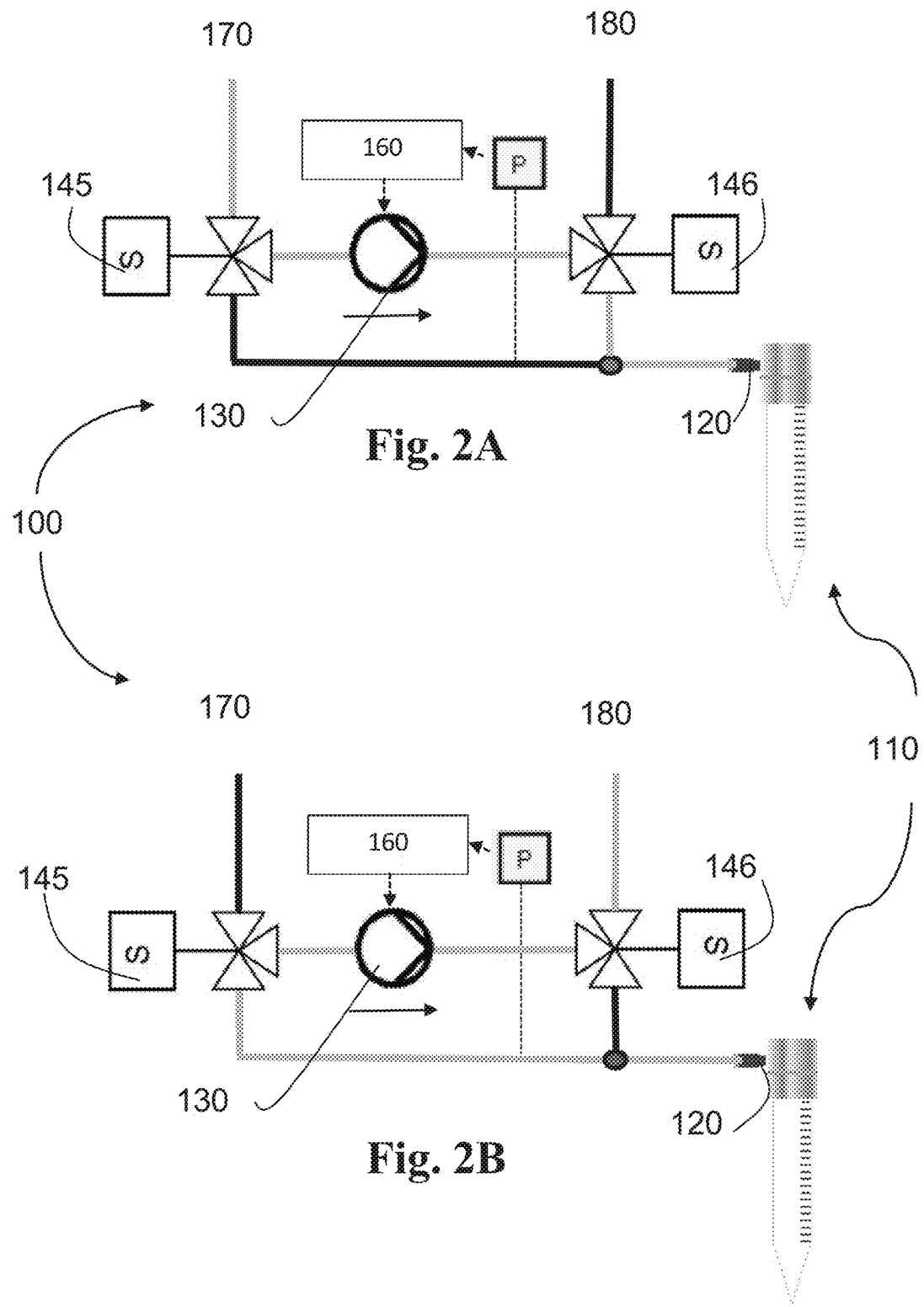

APPARATUS FOR CONTROLLING POSITIVE AND NEGATIVE PRESSURE OR FLOW IN A FLUIDIC SYSTEM

TECHNICAL FIELD

The present invention relates to an apparatus for controlling pressure or flow in a fluidic system. The invention also relates to a method of controlling pressure in a fluidic system, and a method of controlling flow rate of a fluid in a fluidic system. More specifically, the invention proposes an apparatus able to control pressure or flow in reservoir or in a fluidic system, with pressure levels above or below atmospheric pressure, or to control bidirectional flows, with a performance, cost and simplicity superior to previous art.

TECHNICAL BACKGROUND

Regulated pressure sources are a strong and increasing need in various areas of technology. In particular, they may be used to control pressure in a reservoir or in a channel, or to control flow rate in a fluidic system. Several types of systems, such as microfluidic based systems or biomedical systems, require pressure sources that are highly efficient and avoid the pulses typically generated by syringe pumps or peristaltic pumps. In many applications, it is useful to be able to apply both positive and negative pressures (e.g. relative to atmosphere) to the same outlet.

Standard regulated pressure sources typically comprise an external pressure source and are thus rather bulky. Such external pressure sources may be a pressurized air line in a building, an external piston pump or a pressurized air bottle; however, they require specialized fixed equipment, and they are not portable. Pumps having a sufficient power to drive standard pressure sources require high power consumption typically over 10 W, are rather noisy, and can induce vibrations. In addition, they must be operated continuously, which increases nuisances and power consumption. These pressure sources also have a high gas consumption, due of the continuous flow of fluid from the inlet to the outlet. The high gas consumption requires the external pressure source to deliver a relatively high flow of gas, and thus requires high pumping power.

Control of standard regulated pressure sources is another challenge. Some pressure sources exploit proportional valves that are difficult to control accurately in the vicinity of full closure. In order to guarantee a stable performance, the proportional valves should be operated far from the regime of operation near full closure, which results in a relatively high gas consumption. Furthermore, in order to control positive and negative pressures (e.g., relative to the atmosphere), the state of the art is to use two pumps, one to generate positive pressure and the other to generate vacuum, i.e., negative pressure. Pumps are then coupled with an air reservoir and a pressure regulator) in order to achieve stability and required pressure. Such pressure regulators known in the art can be of a passive type, using e.g. a membrane, such as the series of regulators and notably the regulator R119 sold by Aircom®, or active, such as the MFCS-ez sold by Fluigent. In such systems, the pumps are not regulated and are most often operated at their nominal power all the time regardless of the output pressure of the system. The pressure regulator controls a valve opening and the output pressure depends on the maximal generated workload by the pumps and valve opening of the pressure regulator. Therefore, the overall efficiency in such systems is low since a constant air flow goes through the system between both inlet flow paths of the pumps. Furthermore, employing two pumps makes the size of the set-up quite large and since the pumps work at their nominal speed most of the time, the generated noise is disturbing.

Providing a reasonable response time to control signals is another issue. In general, allowing a gas leakage reduces the response time, but at the expense of reduction of the maximum pressure and gas flow rate achievable.

Document U.S. Pat. No. 7,972,561 relates to a pressure monitoring system comprising a chamber configured to be connected at one end of at least one microchannel, an inlet circuit in fluid communication with the chamber, and an outlet circuit separate from said inlet circuit and in fluid communication with the chamber. At least one of the inlet and the outlet circuits comprises a progressively controllable valve so as to control flow rate in the inlet and outlet circuits, so as to modify the pressure at said end of the microchannel.

Document WO2018184971 relates to a microfluidic device comprising a tank supplying a microchannel with a first fluid, and a circuit in which a flow of a second fluid can be established without contact with the microchannel. The circuit passes through the tank or is connected to the tank by a pipe. The circuit comprises an on/off valve mounted in parallel with a proportional valve. The proportional and on/off valves are controllable so as to modify a pressure applied in the tank to the first fluid by the second fluid.

Document GB2569417 relates to a microfluidic drive system comprising a resonant piezoelectric gas pump comprising a substantially cylindrical cavity defined by cavity walls, the cavity having an inlet and an outlet aperture and a piezoelectric actuator arranged to generate oscillatory motion of the cavity walls to drive a gas between the inlet and outlet. A drive circuit is arranged to apply a voltage waveform across the piezoelectric actuator such that the oscillations of the cavity have a frequency of at least 500 Hz. Further, a microfluidic channel is arranged in fluid communication with the inlet or outlet of the pump such that, in use, the varying gas pressure provides a driving force to move a liquid through the microfluidic channel.

The above documents do not solve the abovementioned challenges and do not make it possible for a regulated pressure source to be adapted to many applications. In particular, the above documents are only able to provide pressure modified in one single direction, as compared to the used external reference pressure (e.g., atmospheric pressure).

There is thus a need for a pressure or flow controlling apparatus and method with a fast response, absence of pulses, a small portable size, and the ability to achieve both positive and negative pressure.

SUMMARY OF THE INVENTION

The invention relates to an apparatus for controlling pressure or flow in a fluidic system, the apparatus comprising:
- a main inlet/outlet being configured to be fluidically connected to said fluidic system or to a reservoir of fluid connected to said fluidic system;
- a uni-directional pumping device configured to pump gas from an inlet of the pumping device to an outlet of the pumping device;
- a valves array; and
- a control unit configured to control the valves array and the pumping device;
  wherein the control unit is configured to set the valves array into at least two states comprising:

a first state in which a first gas source is fluidically connected to the inlet of the pumping device, and the outlet of the pumping device is fluidically connected to the main inlet/outlet; and a second state in which the main inlet/outlet is fluidically connected to the inlet of the pumping device, and the outlet of the pumping device is fluidically connected to a second gas source.

In some embodiments, in the first state, the outlet of the pumping device is further fluidically connected to the second gas source; and/or in the second state, the inlet of the pumping device is further fluidically connected to the first gas source.

In some embodiments, the first gas source and the second gas source are a common gas source, preferably the atmosphere.

In some embodiments, the valves array comprises:
a first valve configured to be arranged between the first gas source and the inlet of the pumping device;
a second valve configured to be arranged between the inlet of the pumping device and the main inlet/outlet;
a third valve configured to be arranged between the outlet of the pumping device and the main inlet/outlet;
a fourth valve configured to be arranged between the outlet of the pumping device and the second gas source;
and wherein the first valve, second valve, third valve and fourth valve are bi-directional valves.

In some embodiments, at least one of the four bi-directional valves is an on/off valve.

In some embodiments, at least one of the four bi-directional valves is a continuously controllable valve, preferably at least the first valve and the fourth valve are continuously controllable valves.

In some embodiments, the valves array comprises a first valve and a second valve which are both three ways-two positions valves comprising a common port and two switchable ports, and
the common port of the first valve is configured to be fluidically connected to the inlet of the pumping device;
the two switchable ports of the first valve are configured to be fluidically connected to the first gas source and the main inlet/outlet;
the common port of the second valve is configured to be fluidically connected to the outlet of the pumping device; and
the two switchable ports of the second valve are configured to be fluidically connected to the second gas source and the main inlet/outlet.

In some embodiments, the valves array comprises one four ways-two positions valve.

In some embodiments, the apparatus further comprises a continuously controllable valve configured to be arranged between the main inlet/outlet and a third gas source, preferably the third gas source, the first gas source and/or the second gas source are a common gas source, still preferably the continuously controllable valve is configured to be controlled by the control unit.

In some embodiments, the pumping device comprises one or more piezoelectric pumps and/or one or more piston pumps and/or one or more peristaltic pumps and/or one or more turbine pumps, preferably the pumping device comprises a single piezoelectric pump, piston pump, peristaltic pump, or turbine pump.

In some embodiments, the control unit is further configured to control flow and/or pressure delivered by the pumping device.

In some embodiments, the apparatus is an apparatus for controlling pressure of flow of a liquid in a fluidic system.

The invention also relates to an assembly comprising the above-described apparatus and a fluidic system, the fluidic system being fluidically connected to the main inlet/outlet of the apparatus; or comprising the above-described apparatus, a reservoir of fluid and a fluidic system, the reservoir being fluidically connected to the main inlet/outlet of the apparatus and the fluidic system being fluidically connected to the reservoir.

The invention also relates to a method of controlling pressure or flow (in particular of liquid) in a fluidic system, wherein said fluidic system is fluidically connected to the main inlet/outlet of the above-described apparatus, the method comprising adjusting one or more of said pumping device, and said valves array.

In some embodiments, the method comprise a step of simultaneously flowing gas from the first gas source across the pumping device to both the main inlet/outlet and the second gas source; or simultaneously flowing gas from both the first gas source and the main inlet/outlet across the pumping device to the second gas source.

The invention also relates to a non-transitory computer readable storage medium having stored thereon instructions that, when executed, cause at least one control unit device to carry out the above-described method.

Embodiments of the present invention make it possible to address the needs expressed above. In particular, the one or more embodiments provide an apparatus which makes it possible to efficiently control pressure or flow (preferably, of liquid) in a fluidic system by providing pressure (either positive or negative depending on the user's choice) at an interface with the fluidic system. In addition, one or more embodiments provide a method of controlling pressure in a fluidic system fluidically connected to the main outlet of the apparatus. Further, embodiments provide a method of controlling the flow rate of a fluid in a fluidic system, wherein the fluidic system is either directly fluidically connected to the main outlet of the apparatus or fluidically connected to a reservoir fluidically connected to the main outlet of the apparatus.

More particularly, the apparatus of the present invention is configured to be connected to a first gas source and a second gas source and to a fluidic system or to a reservoir of fluid connected to a fluidic system. The apparatus comprises a valves array and a pumping device as well as a control unit which controls the valves array. The combination of the pumping device and valves array makes is possible to control the pressure and/or the flow rate at the main inlet/outlet. The combination allows a fast response with an ideal gas consumption, power consumption and noise level.

BRIEF DESCRIPTION OF THE DRAWINGS

FIGS. 2A-2B show schematic diagrams of an apparatus according to one embodiment of the present invention comprising a pump, and a valves array comprising two three ways-two positions valves.

DESCRIPTION OF EMBODIMENTS

Figure 1A:
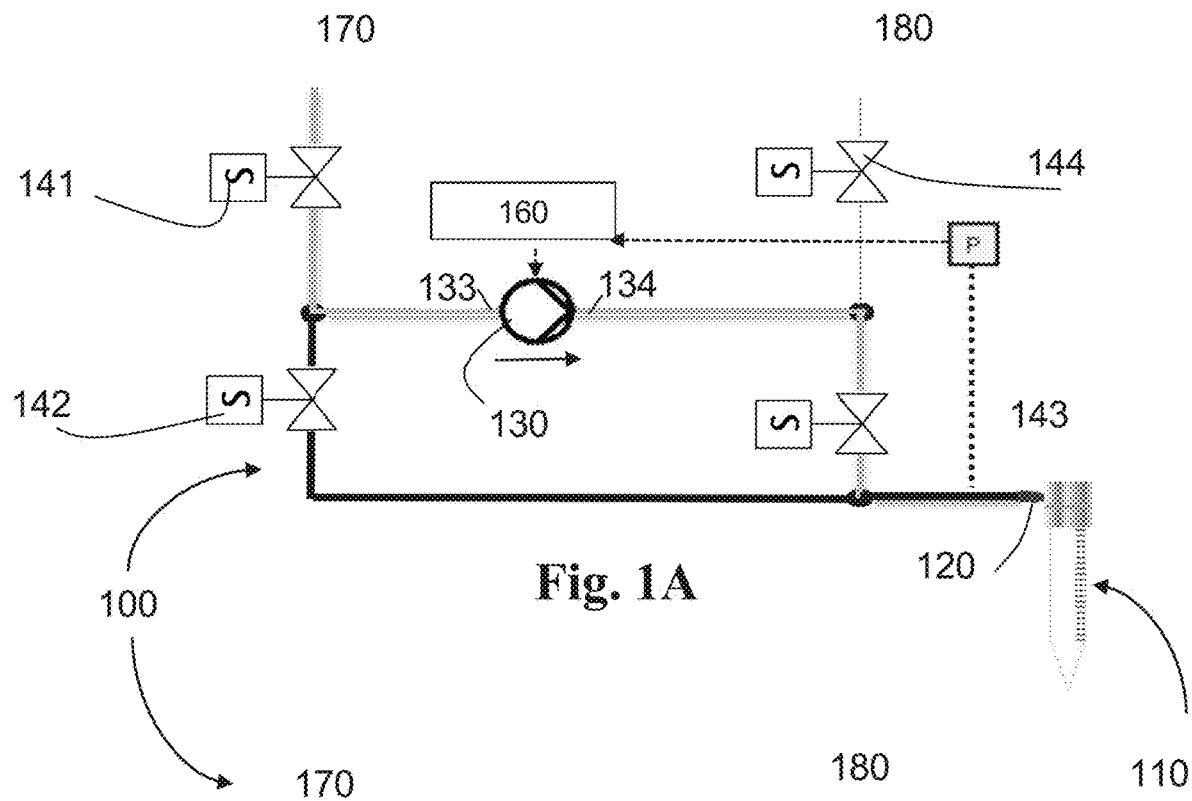
FIGS. 1A-1B show schematic diagrams of an apparatus according to one embodiment of the present invention comprising a pump, and a valves array comprising four bi-directional valves.

Embodiments of the invention will now be described in more detail without limitation in the following description. Apparatus for Controlling Positive and Negative Pressure or Flow (Full-Bridge Configuration)

One or more embodiments of the invention relate to an apparatus 100 as depicted in FIGS. 1A-1B and FIGS. 2A-2B for controlling positive and negative pressure or flow in a fluidic system 110. A "fluidic system" designates a combination of one or more instruments associated to exert one or several tasks in relation to one or more fluids. By "instrument" is meant an integrated device that is able to perform at least one function without the addition of additional components other than components available in the operational environment, such as for instance an energy source, or consumables. In examples, the apparatus 100 may be configured to control the pressure (at a particular location) of a fluidic system by controlling a (e.g., respective) flow rate in said fluidic system. Alternatively or additionally, the apparatus 100 may be configured to control a flow rate in a fluidic system by controlling a pressure at (e.g., a respective location) of said fluidic system. In particularly relevant examples, at least one of the fluids in the fluidic system 110 is a liquid. In such particularly relevant examples, the apparatus 100 may be configured to control a respective flow rate of the liquid flow of the fluidic system 110. By "controlling flow" is meant controlling flow rate.

A fluidic system may comprise at least one channel but optionally comprises other components. A fluidic system may comprise components which are fluidic in their nature and/or function. Fluidic systems may involve different levels of integration. For instance, they can be restricted to a single fluidic chip or component, integrating one or several functionalities. Fluidic systems used in the invention may also comprise other kinds of elements and components, some of which are explicitly described here, such as pumps, valves, sensors, actuators, detectors, and many others known in the art, which are encompassed within the scope of the invention. In particular, fluidic systems may also be full instruments and comprise for instance any of holders, housings, power sources, control software and hardware, communication means, storage means, manipulation means, human-machine interfaces.

In particularly relevant examples, said fluidic system may form or be a part of a system for analyzing a sample. The sample may be for example a biological sample. The fluidic system may form or be a part of a biomedical system configured to perform an analysis, such as for instance a diagnosis. In examples, the fluidic system may be a lab-on-chip device. In examples, said fluidic system may form or be a part of a measurement instrument (e.g., for diagnosis) and/or an instrument for chemical analysis of a system.

The fluidic system may notably be a microfluidic, millifluidic, or nanofluidic system or any combination thereof. By "millifluidic system" is meant a fluidic system in which the minimal channel dimension is of the order of 1-10 mm. By "microfluidic system" is meant a fluidic system in which the minimal channel dimension is of the order of 1 to less than 1000 µm. By "nanofluidic system" is meant a fluidic system in which the minimal channel dimension is of the order of less than 1 µm.

By "fluidic chip" or equivalently "chip", or equivalently "fluidic component", is meant an object comprising at least one channel, or at least one combination of channels. The channel or combination of channels are embedded at least in part in a matrix. Fluidic chips or devices may be microfluidic chips or devices, i.e., comprise at least one microchannel (channel having a minimum dimension of the order of 1 to less than 1000 µm). Fluidic chips or devices may be millifluidic chips or devices, i.e., comprise at least one millichannel (channel having a minimum dimension of the order of 1-10 mm). Fluidic chips or devices may be nanofluidic chips or devices, i.e., comprise at least one nanochannel (channel having a minimum dimension of less than 1 µm). Fluidic chips or devices may comprise any combination of millichannels, nanochannels or microchannels.

The apparatus 100 comprises comprising a main inlet/outlet 120 being configured to be connected to a fluidic system or to a reservoir of fluid connected to said fluidic system. The main inlet/outlet 120 may allow the flow of the gas to flow in both inward and outward direction, depending on the pressure difference across said main inlet/outlet 120.

The apparatus 100 further comprises a uni-directional pumping device 130 configured to pump gas from an inlet 133 of the pumping device to an outlet 134 of the pumping device, and a valves array 140. The uni-directional pumping device 130 may be a check-valve-based pump used only as positive or only as negative pressure supply, generating differential pressure between the inlet and the outlet. By a "valves array" is meant an array of one or more valves in the apparatus. The valves array 140 may form a bridge configuration around the pumping device 130. The bridge configuration may enable the supply of positive and negative pressure (e.g., relative to the atmospheric pressure, or more generally relative to a pressure source) at the main inlet/outlet 120. The one or more valves may be of a same type or different types. The pumping device 130, and the one or more valves of the valves array 140 may be fluidically connected to each other and to the main inlet/outlet by one or more connection devices. Each of the one or more connection devices may comprise a duct. The size and material of the duct may be chosen according the well-known practice and/or standard. Each duct may be linear or branched. Alternatively, by "connection device" can also be meant a direct connection without any intermediary duct. For example, any pump may be directly connected to any valve.

By A being "fluidically connected" to B, is meant that gas may flow between A and B, i.e. the fluid path between A and B is not fully closed.

The apparatus further comprises a control unit 160 configured to control the valves array 140. By controlling the valves array 140, it is meant that the control unit 160 controls the aperture of each of the one or more valves in the valves array 140.

This setup is hereinafter referred to as the full-bridge configuration. Different valve models can be used in this set-up such as bimodal valves, proportional valves, three ways-two positions (3/2) valves or three ways-three positions (3/3) valves having the advantage of combining two unitary valves into one.

Figure 1B:
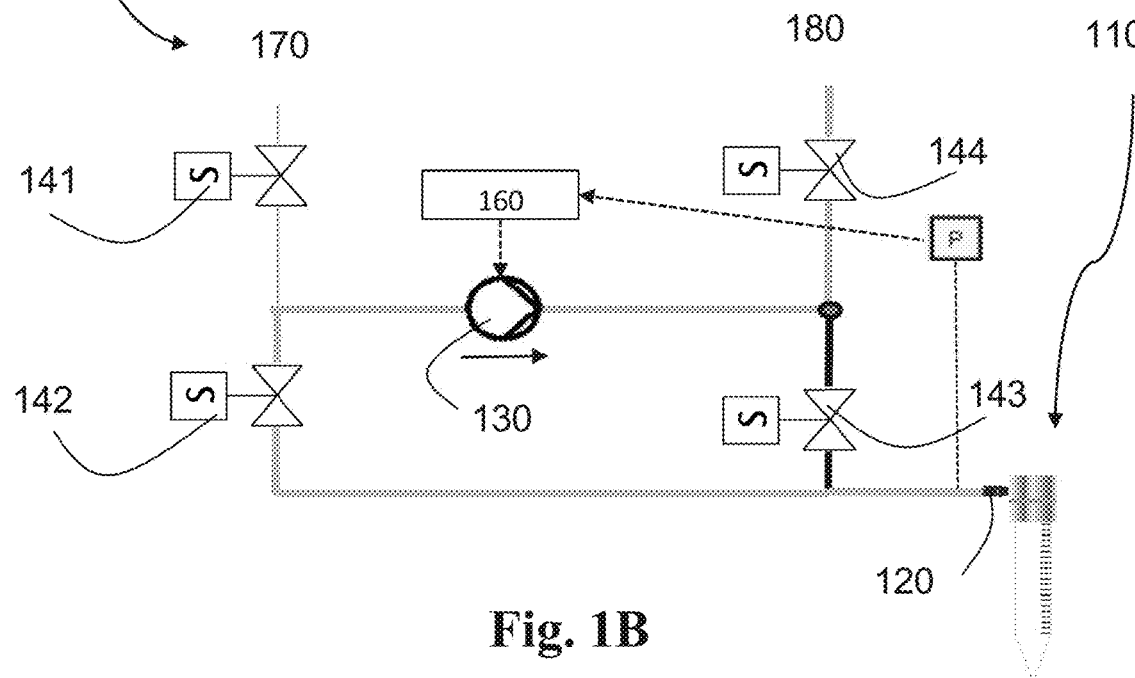

In some embodiments of the full-bridge configuration depicted in FIGS. 1A-1B, the valves array 140 comprises four bi-directional valves 141, 142, 143, 144. The first valve 141 is configured to be arranged between a first gas source 170 and the inlet 133 of the pumping device 130. The second valve 142 is configured to be arranged between the inlet 133 of the pumping device and the main inlet/outlet 120. The third valve 143 is configured to be arranged between the outlet 134 of the pumping device and the main inlet/outlet 120, and the fourth valve 144 is configured to be arranged between the outlet 134 of the pumping device and a second gas source 180. By "bi-directional valve" is meant a valve which allows a flow of fluid in two opposite directions across the valve (as opposed e.g. to check valves). In examples, each of the valves may a be solenoid valve.

Connection devices are therefore present between the first valve 141 and the inlet 133 of the pumping device 130; between the second valve 142 and the inlet 133 of the pumping device 130; between the outlet 134 of the pumping device 130 and the third valve 143; between the outlet 134 of the pumping device 130 and the fourth valve 144; between the second valve 142 and the main inlet/outlet 120; and between the third valve 142 and the main inlet/outlet 120. A connection device may also be present between the first valve 141 and second valve 142; and between the third valve 143 and fourth valve 144, or between the second valve 142 and the third valve 143. Some of these connection devices may be grouped into combined connection devices. For example, a common, branched connection device may fluidically connect the first valve 141, the second valve 142 and the inlet 133 of the pumping device 130; a common, branched connection device may fluidically connect the third valve 143, the fourth valve 144 and the outlet 134 of the pumping device 130; and a common, branched connection device may fluidically connect the second valve 143, the third valve 143 and the main inlet/outlet 120.

Respective connection devices may also be provided between the first valve 141 and the first gas source 170; and between the fourth valve 144 and the second gas source 180. Alternatively, if the first gas source 170 and/or second gas source 180 is the atmosphere (see below), it may be possible to do without a connection device, i.e. the first valve 141 and/or the fourth valve 144 may directly open to the atmosphere.

In examples, the volume of connection devices, i.e., the gas volume contained therein, is as low as possible. This improves the performance of the apparatus as is allows smoother transition (e.g., between positive and negative pressure). In examples where the one or more connection devices comprise a duct, the duct length is therefore small enough to achieve a low volume.

In some preferred embodiments, the total volume in the ducts is less than the volume of the reservoir or is at least 2 times smaller than the volume of the reservoir.

In order to increase pressure in the reservoir or fluidic system (first state, FIG. 1A), the first valve 141 and the third valve 143 are open, and the second valve 142 is closed. The first valve 141 and third valve 143 may be partly open or fully open. The fourth valve 144 may be closed. Thus, gas flows from the first gas source 170 to the main/inlet outlet 120 and then to the reservoir or fluidic system. Alternatively, the fourth valve 144 may be open. In this case, preferably the opening of the first valve 141 is larger than the opening of the fourth valve 144. For example, the first valve 141 may be fully open, while the fourth valve 144 is only partly open. In this case, a leak to the second gas source 180 may be achieved by the fourth valve 144.

Any valve which can provide a leak, according to the present disclosure, can be referred to as a leak valve.

In order to create vacuum or decrease pressure in the reservoir or fluidic system (second state, FIG. 1B), the second valve 142 and the fourth valve 144 are open, and the third valve 143 is closed. The second valve 142 and fourth valve 144 may be partly open or fully open. The first valve 141 may be closed. Thus, gas flows from the main/inlet outlet 120 (and thus from the reservoir or fluidic system) to the second gas source 180. Alternatively, the first valve 141 may be open. In this case, preferably the opening of the fourth valve 144 is larger than the opening of the first valve 141. For example, the fourth valve 143 may be fully open, while the first valve 141 is only partly open. In this case, a leak to the first gas source 170 may be achieved by the first valve 141.

In either of the first state (or pressurizing) and the second state (or depressurizing), the apparatus enables precise controlling of the pressure at the main/inlet outlet which is connected to the fluidic system, thereby enabling controlling the flow, for example, the liquid flow, in the fluidic system.

Small and precise changes in flow or pressure can be achieved owing to the leak, and in particular by opening more or less the leak valve.

The pumping device 130 may be passive or active when the reservoir or fluidic system is depressurized (second state).

In some embodiments, the pumping device 130 always remains active in the second state (and thus in both states) and switching may be carried out between positive and vacuum configurations in order to increase or decrease pressure. This may be faster but this also increase pump load and might create small disruptions during valves switch.

In other embodiments, the pumping device 130 is in passive mode in the second state and air can pass through the pumping device 130 while its internal check valve is naturally opened.

In other embodiments, the pumping device 130 can be in active mode or in passive mode in the second state. This is an advantage for the regulation which can use two different "depressurization speeds".

The above-described full-bridge configuration is advantageous as it is able to generate vacuum and positive pressure with a same apparatus. It is stable (in with respect to pressure and/or flow rate variations) and is able to perform depressurization faster.

In other embodiments of the full-bridge configuration as depicted in FIGS. 2A-2B, the valves array 140 comprises two three ways-two positions (i.e., 3/2) valves 145, 146, each three ways-two positions valve 145, 146 comprising a common port and two switchable ports. The 3/2 valve at each state of function may fluidically connect at most one of the two switchable ports to the common port. The common port of the first valve 145 is fluidically connected to the inlet 133 of the pumping device 130, and the two switchable ports of the first valve 145 are fluidically connected to the first gas source 170 and the main inlet/outlet 120 respectively. The common port of the second valve 146 is fluidically connected to the outlet 134 of the pumping device 130 and the two switchable ports of the second valve 146 are fluidically connected to the second gas source 180 and the main inlet/outlet 120. Such embodiments improve the maximal achievable pressure and lower the pumping power.

Connection devices are therefore present between the first valve 145 and the inlet 133 of the pumping device 130; between the outlet 134 of the pumping device 130 and the second valve 146; between the first valve 145 and the main inlet/outlet 120; and between the second valve 146 and the main inlet/outlet 120. Some of these connection devices may be grouped into combined connection devices. For example, a common, branched connection device may fluidically connect the first valve 145, the second valve 146 and the main inlet/outlet 120.

Respective connection devices may also be provided between the first valve 145 and the first gas source 170; and between the second valve 146 and the second gas source 180. Alternatively, if the first gas source 170 and/or second gas source 180 is the atmosphere (see below), it may be possible to do without a connection device, i.e., the first valve 145 and/or the second valve 146 may directly open to the atmosphere.

The first valve 145 and second valve 146 may be of a bimodal type having two states, or more precisely two distinct flow paths, and thus comprising a finite number of openings. Control may be achieved by switching from fully closed to fully opened or from fully opened to fully closed. Such valves are commonly referenced as on/off valves.

This stands in contrast with the embodiments of FIGS. 1A-1B, wherein, preferably, the first, second, third and fourth valves 141, 142, 143, 144 are continuously controllable (such as proportional), so that they can be represented by a series of multiple openings. These may also be designated as tunable valves or tunable openings, and multiple (three or more) flow paths can therefore be achieved.

In order to increase pressure in the reservoir or fluidic system (first state, FIG. 2A), the first valve 145 and the second valve 146 are configured in such a way that gas flows from the first gas source 170, across the pumping device 130, and to the main/inlet outlet 120 and then to the reservoir or fluidic system.

In order to create vacuum or decrease pressure in the reservoir or fluidic system (second state, FIG. 2B), the first valve 145 and the second valve 146 are configured in such a way that gas flows from the main/inlet outlet 120 (and thus from the reservoir or fluidic system) to the second gas source 180.

The pumping device 130 may be active or passive during depressurization, as described above in connection with FIGS. 1A-1B.

In other embodiments (not illustrated), the valves array 140 may comprise both bi-directional valves as depicted in FIGS. 1A-1B and at least one three ways-two positions valve as depicted in FIGS. 2A-2B.

For example, in one variation, the apparatus is similar to what is depicted in FIGS. 1A-1B, including the first valve 141 and second valve 142, except that the third valve 143 and fourth valve 144 are replaced by a three ways-two positions valve corresponding to the second valve 146 shown in FIGS. 2A-2B. In this variation, it may be possible to have a leak during depressurization (by opening the first valve 141).

For example, in another variation, the apparatus is similar to what is depicted in FIGS. 1A-1B, including the third valve 143 and fourth valve 144, except that the first valve 141 and second valve 142 are replaced by a three ways—two positions valve corresponding to the first valve 145 shown in FIGS. 2A-2B. In this variation, it may be possible to have a leak during pressurization (by opening the fourth valve 144).

Figure 3:
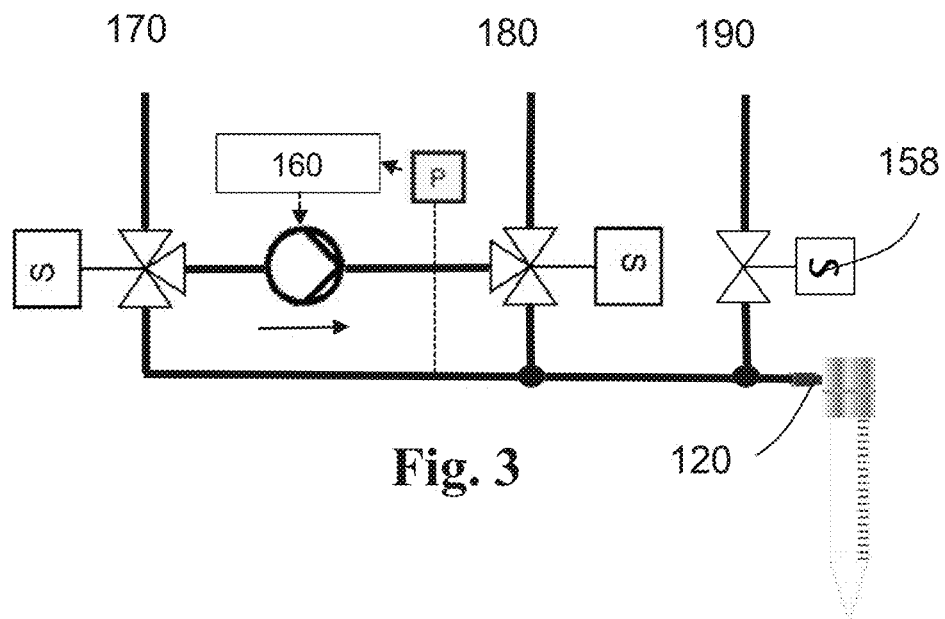
FIG. 3 shows a schematic diagram of an apparatus according to one embodiment of the present invention comprising a pump, and a valves array comprising two three ways-two positions valves and further comprising an additional valve.

In another embodiment as depicted in FIG. 3, the valves array 140 of the apparatus (which in this case comprises two three ways-two positions valves and is otherwise similar to the apparatus described in connection with FIGS. 2A-2B) further comprises an additional valve 158 configured to be arranged between the main inlet/outlet 120 and a third gas source 190. The additional valve 158 may be a continuously controllable valve.

As already mentioned above, by "a continuously controllable valve" is meant a valve the aperture of which can be controlled continuously between fully open and fully closed. A continuously controllable valve is configured to adopt a series of multiple (i.e. more than 2) opening values or a series of continuous values of flow resistance, in response to a series of different control signals. In examples, the continuously controllable valve may be a proportional valve. In such proportional valves the series of multiple opening values is a continuous series.

Preferably the third gas source 190, the first gas source and/or the second gas source are a common gas source. The additional valve 158 may be configured to be controlled by the control unit. A common branched connection device may be provided to fluidically connect the first valve 145, the second valve 146, the additional valve 158 and the main inlet/outlet 120.

Whenever the additional valve 158 is open (preferably partly open), a leak is provided.

Figures 4A, 4B:
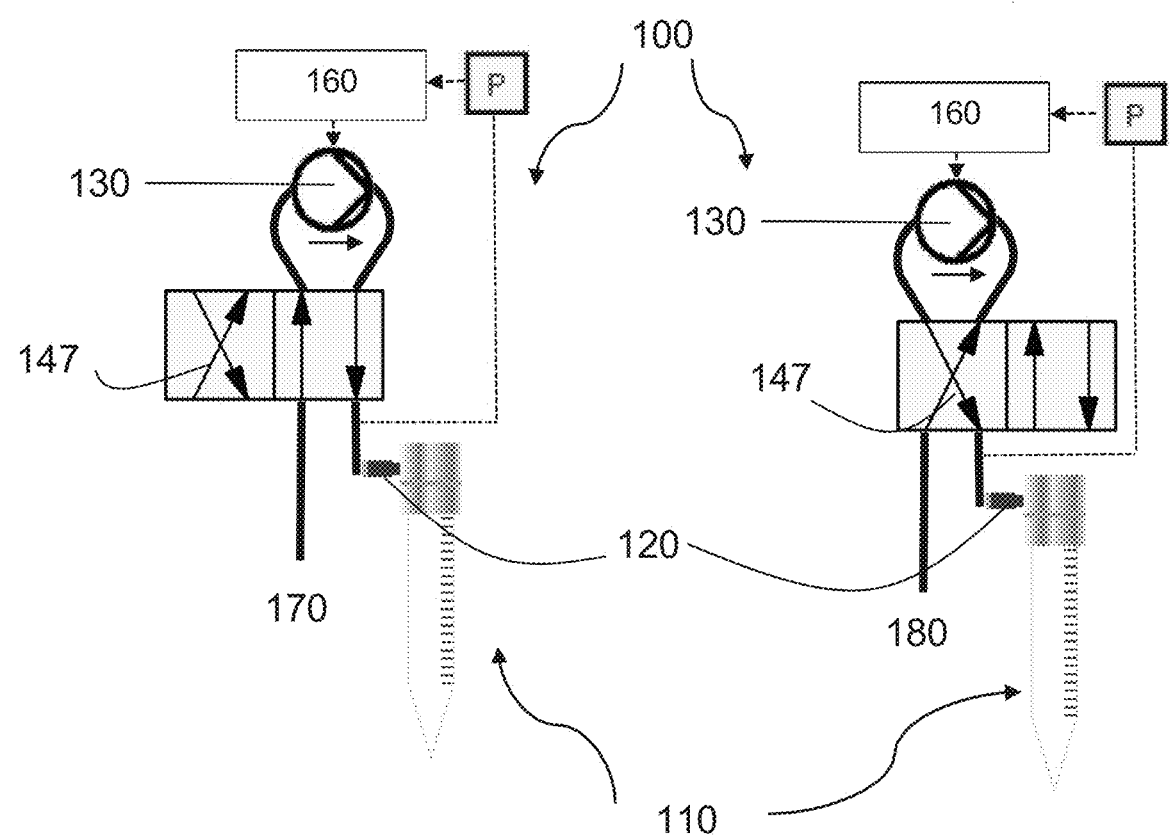
FIGS. 4A-4B show schematic diagrams of an apparatus according to one embodiment of the present invention comprising a pump, and a valves array comprising one four ways-two positions valve.

In another embodiment as depicted in FIGS. 4A-4B, the valves array 140 comprises one four ways-two positions valve 148. The valve comprises a number of external ports, for example four external ports as illustrated in FIGS. 4A-4B. Connection devices are provided between the valve and the inlet 133 of the pumping device 130; between the valve and the outlet 134 of the pumping device 130; between the valve and main inlet/outlet 120. Optionally, connection devices may be provided between the valve and the first gas source 170 and/or second gas source 180 (unless the valve simply has one or more ports open to the atmosphere). Preferably, the first gas source 170 and the second gas source 180 are the same, and the valve comprises a single connection (or open port) to this common gas source.

When the valve is in a first position (FIG. 4A), gas flows from the first gas source 170 across the pumping device 130 and to the main inlet/outlet 120 and then the reservoir or fluidic system. This is the first state, in which the reservoir or fluidic system is pressurized. When the valve is in a second position (FIG. 4B), gas flows from the main inlet/outlet 120 (and thus from the reservoir or fluidic system) across the pumping device 130 and to the second gas source 180. This is the second state, in which the reservoir or fluidic system is depressurized.

The configuration shown in FIGS. 4A-4B is particularly compact and simple to operate. On the other hand, the other embodiments described in connection with FIGS. 1A to 3 are preferable in other aspects. Among the discussed embodiments above, the embodiments in relation to FIGS. 1A, 1B and 3 allow a smooth depressurization in case of small steps and regulating near atmospheric pressure, especially when they include a proportional valve. Activating a valve like an on/off valve requires an opening time depending on the valve mechanical and electrical design. Using proportional valves is less sensitive to the precision of the timing control of the valves. Using proportional valves is further beneficial in very low decrements, as these valves do not create too much pressure drop. Proportional valves do not generate undesired residual pressure during the switching due to volume displacement. On other hand, on/off valves such as 2/3 or 3/3 valves offer more compactness, simplified use and a lower cost.

The following statements apply to all of the embodiments described above.

According to some embodiments, the pumping device 130 is able to operate in a controllable range of output flow and/or pressure. According to some embodiments, said pumping device 130 comprise one or more piezoelectric pumps. According to some embodiments, said pumping device 130 comprises a resonant pump. According to some other embodiments, said pumping device 130 may comprise a pump of another type or combination of pumps of other types, such as turbine pumps, peristaltic pumps, piston pumps, or membrane pumps. The choice between these different types of pumps may be made as known in the art to make the best compromise, for each application, between size, weight, cost, power consumption, type of power source (e.g. AC or battery), and maximum pressure and flow rate needed for a given application of the apparatus. The invention makes it possible to use a single pump as a pumping device 130.

According to some embodiments, the pumping device 130 may be configured to pump gas from said first gas source 170 to said fluidic system 110, via said main inlet/outlet 120. In some preferred embodiments, the apparatus 100 is configured to increase the pressure at the main outlet 120 and the fluidic system 110, i.e., to pressurize. During pressurizing, the gas may significantly flow to the main inlet/outlet 120 and enter the fluidic system 110. During pressurizing, the gas may also flow, i.e., "leak" to the second gas source 180 via the fourth valve 144.

According to some embodiments, the pumping device 130 may be configured to pump gas via said main inlet/outlet 120 from said fluidic system 110 to said first gas source 170. In some preferred embodiments, the apparatus 100 is configured to decrease the pressure at the main inlet/outlet 120 and the fluidic system 110, i.e., to depressurize. During depressurizing, the gas may significantly flow, i.e., "leak" to the first gas source 170 via the fourth valve 141.

The pressurizing and the depressurizing may be combined according to some other embodiments in which said pumping device 130 may be configured to pump gas from the inlet 105 via the main inlet/outlet 102 to said fluidic system 110, or from said fluidic system 110 via the main inlet/outlet 120 to the inlet 105, depending on a signal received from a drive system. For example, pressurizing and depressurizing may be combined according to some embodiments to provide a specific pressure profile at the main inlet/outlet 102 of the apparatus. The specific pressure may be constant pressure.

In some embodiments said first 170, said second 180, and said (optional) third gas source 190 may be sources of air, or of a different gas. Using different gases may be employed according to some well-known practice and standards not to exhaust a hazardous gas in the atmosphere. Each gas source 170, 180, and 190 may be either the atmosphere, or a container containing a gas.

In some other embodiments, any of said first, said second, and said third gas source may comprise several gases and/or may include a plurality of gas containers. According to some embodiments, the first 170, the second 180, and the third gas source 190, or any combination between gas sources 170, 180 and 190 are a same gas source. In some preferred embodiments the said common gas source is the atmosphere. In other embodiments, the first gas source and the second gas sources may be a gas container (preferably containing a gas other than air), while the third gas source 190 is the atmosphere.

The specific components, their precise location and configuration of fluidic paths may vary according to a given application according to embodiments of the present invention.

Apparatus for Controlling Positive and Negative Pressure or Flow (Half-Bridge Configuration)

Figure 5A:
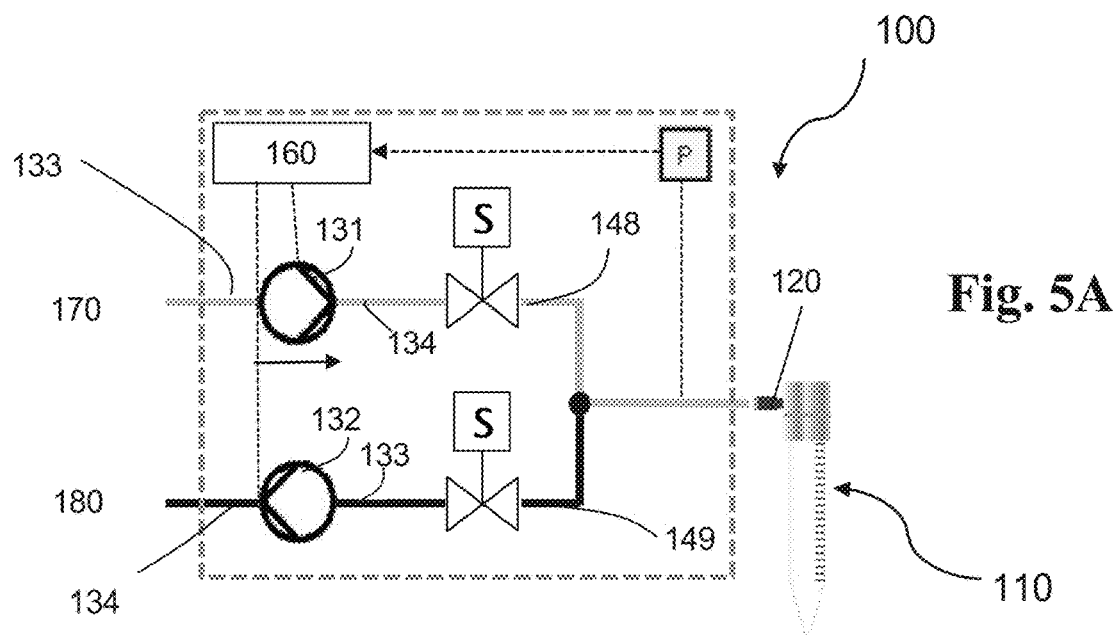
FIGS. 5A-5C show a schematic diagrams of an apparatus according to one embodiment of the present invention comprising two pumps, and a valves array comprising two bi-directional valves.
Figure 5B:
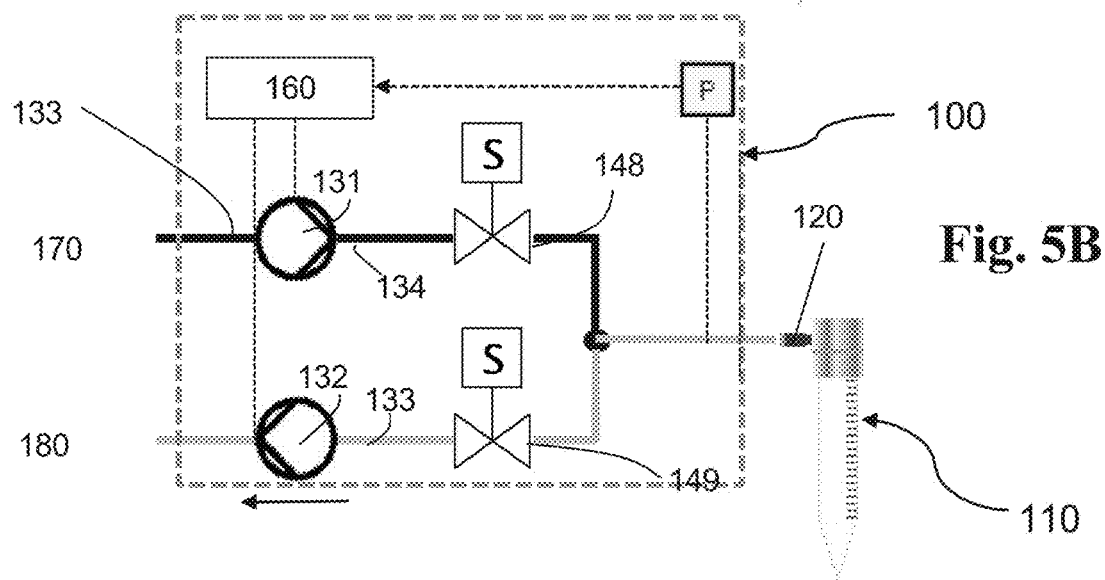
Figure 5C:
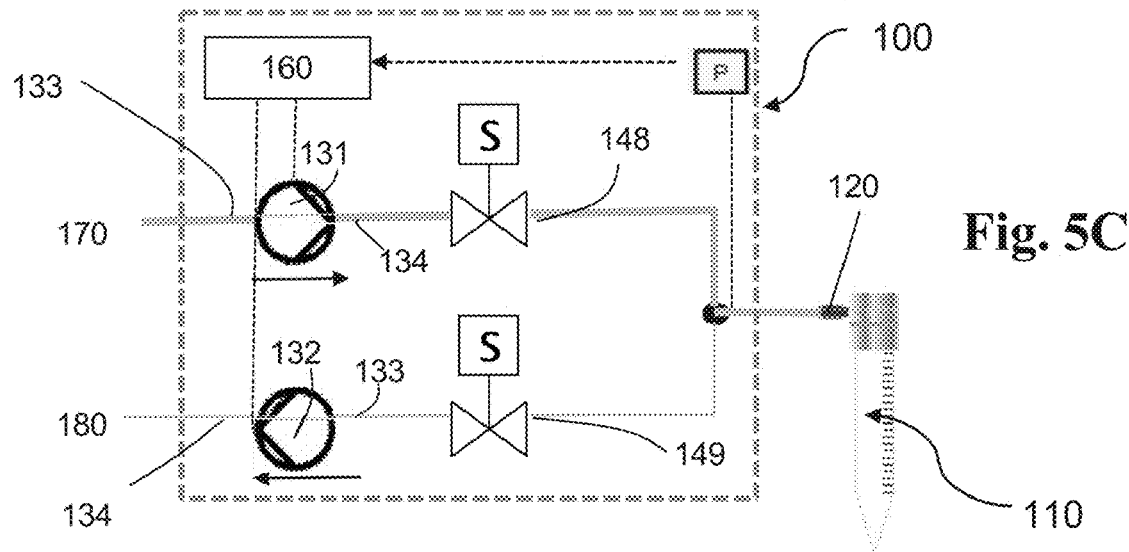

Another aspect of the invention is an apparatus 100 as depicted in FIGS. 5A-5C for controlling positive and negative pressure or flow in a fluidic system 110.

According to this aspect, and making reference by way of illustration to FIGS. 5A-5C, the invention relates to the following items:

1. An apparatus 100 for controlling pressure or flow (e.g., a liquid flow) in a fluidic system 110 (preferably a millifluidic, microfluidic or nanofluidic system, more preferably a microfluidic or nanofluidic system), the apparatus 100 comprising:
   a main inlet/outlet 120 being configured to be fluidically connected to said fluidic system 110 or to a reservoir of fluid connected to said fluidic system 110;
   a first uni-directional pumping device 131 and a second uni-directional pumping device 132 each configured to pump gas across an inlet 133 of the respective pumping device to an outlet 134 of the respective pumping device;
   a valves array 140 comprising a first valve 148 and a second valve 149; and
   a control unit 160 configured to control the valves array 140 and the first and the second pumping devices;
   wherein the control unit 160 is configured to set the valves array 140 into at least two states comprising:
   a first state in which a first gas source 170 is fluidically connected to the inlet of the first pumping device 131 and the outlet of the first pumping device 131 is fluidically connected to the main inlet/outlet 120; and
   a second state in which the main inlet/outlet 120 is fluidically connected to the inlet of the second pumping device 132, and the outlet of the second pumping device 132 is fluidically connected to a second gas source 180.

2. The apparatus of item 1, wherein the control unit 160 is further configured to set the valves array 140 into a third state in which the first gas source 170 is fluidically connected to the inlet of the first pumping device 131, the outlet of the first pumping device 131 is fluidically connected to the main inlet/outlet 120, the main inlet/outlet is further fluidically connected to the inlet of the second pumping device 132, and the outlet of the second pumping device 132 is fluidically connected to the second gas source 180.

3. The apparatus 100 of item 1 or item 2, wherein the first gas source 170 and the second gas source 180 are a common gas source, preferably the atmosphere.

4. The apparatus 100 of any of items 1 to 3, wherein the valves array 140 comprises two bi-directional valves, and
  the first valve 148 is configured to be arranged between the outlet of the first pumping device 131 and the main inlet/outlet 120, and
  the second valve 149 is configured to be arranged between the inlet of the second pumping device 132 and the main inlet/outlet 120.

5. The apparatus 100 of item 4, wherein at least one of the bi-directional valves 148, 149 is a continuously controllable valve.

6. The apparatus 100 of any of items 1 to 5, further comprising a continuously controllable valve configured to be arranged between the main inlet/outlet 120 device and a third gas source, preferably the third gas source, the first gas source 170 and/or the second gas source 180 are a common gas source, still preferably the third valve is configured to be controlled by the control unit 160.

7. The apparatus 100 of any of items 1 to 6, wherein the control unit 160 comprises an electric driver system, preferably an electronic driver system, still preferably control unit 160 is further configured to control flow and/or pressure delivered by the first pumping device 131 and/or the second pumping device 132.

8. The apparatus 100 of any of items 1 to 7, wherein each pumping device comprises one or more piezoelectric pumps and/or one or more piston pumps and/or one or more peristaltic pumps and/or one or more turbine pumps, preferably each pumping device comprises a single piezoelectric pump, piston pump, peristaltic pump, or turbine pump.

9. An assembly comprising:
  the apparatus 100 of any one of items 1 to 8 and a fluidic system 110, the fluidic system 110 being fluidically connected to the main inlet/outlet 120 of the apparatus 100; or
  the apparatus 100 of any one of items 1 to 8, a reservoir of fluid and a fluidic system 110, the reservoir being fluidically connected to the main inlet/outlet 102 of the apparatus 100 and the fluidic system 110 being fluidically connected to the reservoir.

10. A method of controlling pressure or flow in a fluidic system 110, wherein said fluidic system 110 is fluidically connected to the main inlet/outlet 102 of an apparatus 100 according to any of items 1 to 8, the method comprising adjusting one or more of said pumping devices 131 and 132, and said valves array 140.

11. The method of item 10, comprising a step of simultaneously flowing gas from the first gas source 170 across the first pumping device 131 to both the main inlet/outlet 120 and the second gas source 180; or simultaneously flowing gas from both the first gas source 170 and the main inlet/outlet 120 across the second pumping device 132 to the second gas source 180.

12. A non-transitory computer readable storage medium having stored thereon instructions that, when executed, cause at least one control unit 160 to carry out the method of item 10 or 11.

In this aspect, the apparatus set-up is equipped with two pumping devices and two valves. Other than the difference in pumping device and valves array structure, the entire above description (including all specific features of the full-bridge configuration) applies similarly to this aspect. In particular, according to some embodiments of this aspect, the apparatus 100 comprises a first fluidic path for pressurization using a first pumping device 131 and a second fluidic path for depressurization using a second pumping device 132.

The pumping devices and the valves are inside a same apparatus. This enables to control the pumps' power and the valves by a same control system. This provides an improved solution compared to the comparative assembly as it enables adapting the pump drive power depending on pressure output; for example, in order to increase output pressure, only the first fluidic path may be driven.

In some embodiments of the half-bridge configuration depicted in FIGS. 5A-5B, the valves array 140 comprises two bi-directional valves 148, and 149. The first valve 148 is configured to be arranged between an outlet of the first pumping device 131 and the main inlet/outlet 120, i.e., on the first path. The second valve 149 is configured to be arranged between the main inlet/outlet 120 and an inlet of the second pumping device 131, i.e., on the second path.

Connection devices are therefore present between the outlet of the first pumping device 131 and the first valve 148; between the first valve 148 and the main inlet/outlet 120; between the main inlet/outlet 120 and the second valve 149; and between the second valve 149 and the second pumping device 132. A connection device may also be present between the first valve 148 and second valve 149. Some of these connection devices may be grouped into combined connection devices. For example, a common, branched connection device may fluidically connect the first valve 148, the second valve 149, and the main inlet/outlet 120.

Respective connection devices may also be provided between the first pumping device 131 and the first gas source 170; and between the second pumping device 132 and the second gas source 180. Alternatively, if the first gas source 170 and/or second gas source 180 is the atmosphere it may be possible to do without a connection device, i.e., the first pumping device 131 and the second pumping device 132 may directly open to the atmosphere.

In order to increase pressure in the reservoir or fluidic system (first state, FIG. 5A), the first valve 148 is open, and the second valve 149 is closed. Thus, gas flows from the first gas source 170 to the main/inlet outlet 120 and then to the reservoir or fluidic system. Alternatively, the first valve 148 is open while the second valve 149 is partly open or fully open (third state, FIG. 5C). In this case, preferably the opening of the first valve 148 is larger than the opening of the second valve 149. For example, the first valve 148 may be fully open, while the second valve 149 is only partly open. In this case, a leak to the second gas source 180 may be achieved by the second valve 149. In such a case, the second pumping device 132 may in passive mode or in active mode.

In order to create vacuum or decrease pressure in the reservoir or fluidic system (second state, FIG. 5B), the second valve 148 is open, and the first valve 148 is closed. Thus, gas flows from the main/inlet outlet 120 (and thus from the reservoir or fluidic system) to the second gas source 180. Alternatively, the second valve 149 is open while the first valve 148 may be open or partly open. In this case, preferably the opening of the second valve 149 is larger than the opening of the first valve 148. For example, the second valve 149 may be fully open, while the first valve 148 is only partly open. In this case, a leak to the first gas source 170 may be achieved by the first valve 148.

The apparatus according to this aspect of the invention provides a way to control pressure or flow rate in a system with a short response time, and with limited or no hysteresis. According to this aspect, in either of pressurizing or depressurizing, the apparatus enables precise controlling the pressure at the main/inlet outlet which is connected to the fluidic system, thereby enabling controlling the flow, for example, the liquid flow, in the fluidic system.

Control of the Pressure and/or Flow Rate

Figure 6:
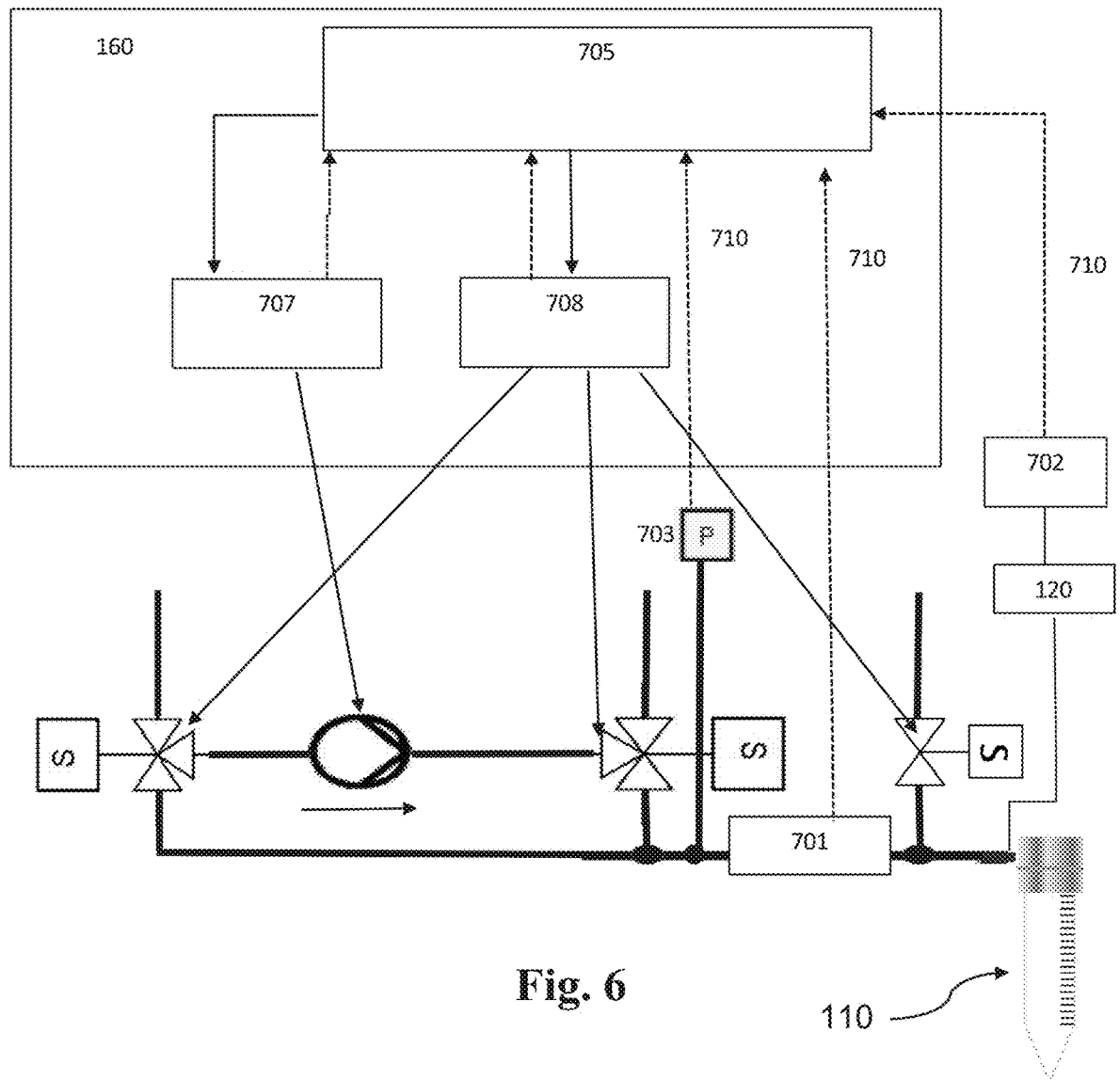
FIG. 6 shows a schematic diagram of an embodiment of an apparatus, including a drive system.

At least one embodiment of the invention also relates to a method of controlling pressure and/or flow rate in a fluidic system 110 which is discussed with reference to FIG. 6. In examples according to this embodiment, the apparatus 100 of the invention may be a part of an assembly. Such an assembly may be used to control an inflow/outflow of fluid and/or pressure at the fluidic system. In examples according to this embodiment, the controlling of flow rate in the fluidic system may be controlling a liquid flow rate in said fluidic system. In FIG. 6, the apparatus 100 is according to FIG. 3 as described above. But the present description applies equally to any other embodiment of the apparatus, in the full-bridge configuration or in the half-bridge configuration.

The method of controlling pressure controls the pressure in a fluidic system 110, when said fluidic system 110 is fluidically connected to the main inlet/outlet 120 of an apparatus 100 of the invention. The method comprises adjusting one or more of the pumping device 130 and the valves array 140.

The method of controlling flow rate controls the flow rate of a fluid (e.g., liquid) in a fluidic system 110 when said fluidic system 110 is fluidically connected to the main inlet/outlet 120 of an apparatus 100 of the invention or fluidically connected to a reservoir of fluid (e.g., liquid), the reservoir being fluidically connected to the main inlet/outlet 120 of an apparatus 100 of the invention. The method comprises adjusting one or more of the pumping device 130 and the valves array 140.

In some embodiments, the fluidic system 110 may be fluidically connected by at least one of its fluidic ports, to the main inlet/outlet 120 of an apparatus 100 of the invention. In some preferred embodiments, the fluidic system 110 is connected to a reservoir containing a liquid, said reservoir being additionally connected to the main inlet/outlet 120 of an apparatus 100 of the invention. Said fluidic system may be connected by at least another of its port to a gas or liquid source at a pressure different from the pressure at the main inlet/outlet 120 of said apparatus.

The method of controlling the pressure and the method of controlling the flow rate may be applied on a same fluidic system 110 at the same time.

In some preferred embodiments the valves array 140 and the pumping device 130 are controlled by a driver system. In some preferred embodiments, the valves array 140 and the pumping device 130 are controlled by a single driver system. The driver system may be an electric, or preferably electronic, driver system. The set of one or more driver systems may be equivalently referred to as the control unit.

In reference to FIG. 6, the apparatus may comprise a control unit 160. The control unit 160 makes it possible for a user to control one or more of the parameters of the flow rate and the pressure at the main inlet/outlet 120 of the apparatus 100. The control unit 160 may comprise a graphical user interface which allows to choose an input value for one or more than one parameter.

The control unit 160 may ensure a fully automated operation of the apparatus 100 and assembly.

The control unit 160 may comprise one or more processors or microprocessors 705 coupled to a storage medium, as well as a computer program comprising instructions stored thereon, for performing various steps described in more detail below. The control unit 160 may comprise any of an electronic board, a computer, a microprocessor, or a manual controller.

The control unit 160 may be configured to receive input 610 from any combination of one or more sensors, including pressure sensors and/or flow meters, as well as input from the user. The one or more pressure sensors and/or flow meters may be within the apparatus 100 or connected to it.

The control unit 160 may be configured to receive input from one or more pressure sensors, such as: a pressure sensor 703 at the main inlet/outlet 120 of the apparatus 100, and/or a pressure/flow sensor, or at the inlet 133 or outlet 134 of the pumping device 130. In some preferred embodiments, sensors are positioned close to the main inlet/outlet 120 to be less impacted by the fluctuations after the pump.

The control unit 160 may be also configured to receive input from any other pressure sensor, flow meter, light sensor, pH sensor, camera, and/or current or voltage sensor which may be present in the assembly, within the apparatus or not, such as an external pressure sensor 702. The sensors may in particular be located in or associated with the fluidic system 110.

The control unit may process the input data and/or the user instructions and as a result, provide instructions to the various control valves and pressure controllers, and in particular to the valves array 140. The control unit 160 may comprise one or more sections each configured to control a particular part of the apparatus 100. For example, the control unit 160 may comprise a section 707 to control the power of the pumping device 130 and/or a section 708 to control the one or move valves of the valves array 140.

The control unit 160 may provide the instructions according to any known regulation algorithm in the field of control engineering to correspond one or more of the pressure or the flow rate to the user instructions, for example a desired pressure or flow rate profile at the main outlet of the apparatus. In some preferred embodiments, the regulation algorithm involves a closed loop configuration. The regulation algorithm may be of the proportional type (P), integral type (I), derivative type (D), proportional-integral type (PI), proportional-derivative type (PD), integral-derivative type (ID), preferably proportional-integral-derivative type (PID) or any other known algorithms in the control theory comprising linear models, deterministic system control, fuzzy logic, and machine-learning.

In some preferred embodiments, the apparatus may be operated as follows:
the valves array is set such that the first gas source is fluidically connected to the inlet of a or the pumping device, and the outlet of a or the pumping device is fluidically connected to the main inlet/outlet while the pumping device is pressurizing a connected reservoir or fluidic system; and/or the valves array is set such that the first gas source is fluidically connected to the inlet of a or the pumping device, and the outlet of the pumping device is fluidically connected to the main inlet/outlet and the outlet of a or the pumping device is further fluidically connected to the second gas source (so as to provide a leak) while the pumping device is pressurizing a connected reservoir or fluidic system; and/or the valves array is set such that the main inlet/outlet is fluidically connected to the inlet of a or the pumping device, and the outlet of a or the pumping device is fluidically connected to a second gas source, while the pumping device is de-pressurizing a connected reservoir or fluidic system; and/or the valves array is set such that the main inlet/outlet is fluidically connected to the inlet of a or the pumping device, the outlet of the pumping device is fluidically connected to a second gas source, and the main inlet/outlet is further fluidically connected to the first gas source while the pumping device is de-pressurizing a connected reservoir or fluidic system; and/or the valves array is set such that, while a or the pumping device is de-pressurizing a connected reservoir or fluidic system as discussed above, a leak valve may be significantly open and a or the pumping device may be shut off, so as to decrease the pressure at the main inlet/outlet; and/or the valves array is set such that, while a or the pumping device is de-pressurizing a connected reservoir or fluidic system as discussed above, a leak valve may be significantly open and a or the pumping device may be operated at the end of a pressure transition in order to allow smoother transitions; and/or any leak valve may be closed while a or the pumping device is operated, to maintain a constant pressure at the main inlet/outlet.

Operating a/the pumping device while allowing the control system to open fully or partly the leak valve provides a more tuneable system. Having both a leak valve open and a pumping device operated at the same time is also useful when operating at the boundaries of the achievable pressure range, i.e., near minimal or near maximal pressure. At low pressure, the leak valve can always remain open since small variations on the pumping device generate high relative variations of pressure. Similarly, at high pressure, when the valve is opened, it generates a significant pressure drop that can be attenuated by keeping the pumping device operating.

EXAMPLES

The following examples illustrate the invention without limiting it.

The setup of FIG. 6, as well as a variation thereof with the half-bridge configuration, were used. The experimental set-up was composed of one or two piezoelectric air pumps capable of delivering up to 0.75 L/min and a maximal achievable pressure of 400 mbar. System outlet was connected to a 20 ml reservoir at its outlet through a tubing. The experimental set-up was also composed of a valve array with from two up to four proportional drivers. Valves can proportional or be bistable (on/off) depending on the set-up, and are derived by same electronics. A pressure transducer was also mounted on the same air path to measure the pressure of the reservoir. A drive circuit set the pump power, valves array opening while measuring the pressure.

The details of the setup are provided in Table 1.

TABLE 1

| Description | Reference |
| --- | --- |
| Air pump | DP-S2-007 from TTP Ventus |
| Reservoir | 15 ml Ependorf + Fluigent pCAP + 4 mm diameter tubbing |
| Pressure sensor | Honeywell ABP Series 1bar range digital |
| Valves | Asco R202A543L0V00F1 SMC S070-5BC |

Example 1

An experimental set-up was composed of a half-bridge configuration as described in relation to FIGS. 5A-5C where each of the pumps 131 and 133 in the half-bridge configuration is of the type in Table 1. The set-up was tested for depressurization time between for each of passive and active use of the pumps. The set-up was tested against the command of a square-wave input C.

Figure 7:
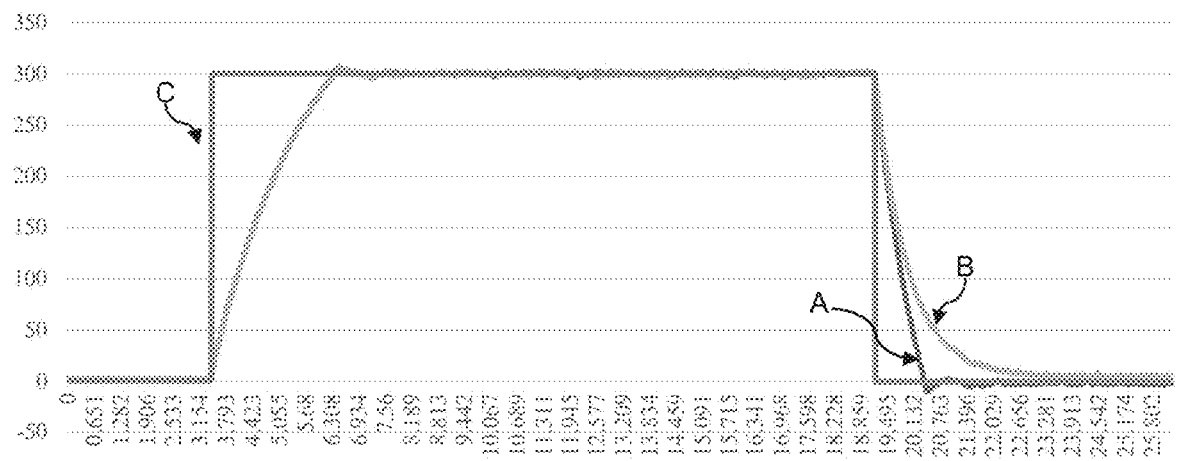
FIG. 7 shows examples of pressure responses of the embodiment of FIGS. 5A-5C and with active pump operation A and passive pump operation B, in response to a square-wave input C as target pressure. The pressure at the main inlet/outlet of the apparatus can be read on the Y-axis and the time (in s) can be read on the X-axis.

FIG. 7 shows the pressure response for the active pump A, the pressure response for the passive pump B and the square-wave input C. The unit on the Y axis is mbar. In the passive use, when the pump is not used and pressure is applied at its input, the pump is opened due to its internal check valve and the flow can freely pass through. Additional powering of the pump enhances response time.

Example 2

Figure 8:
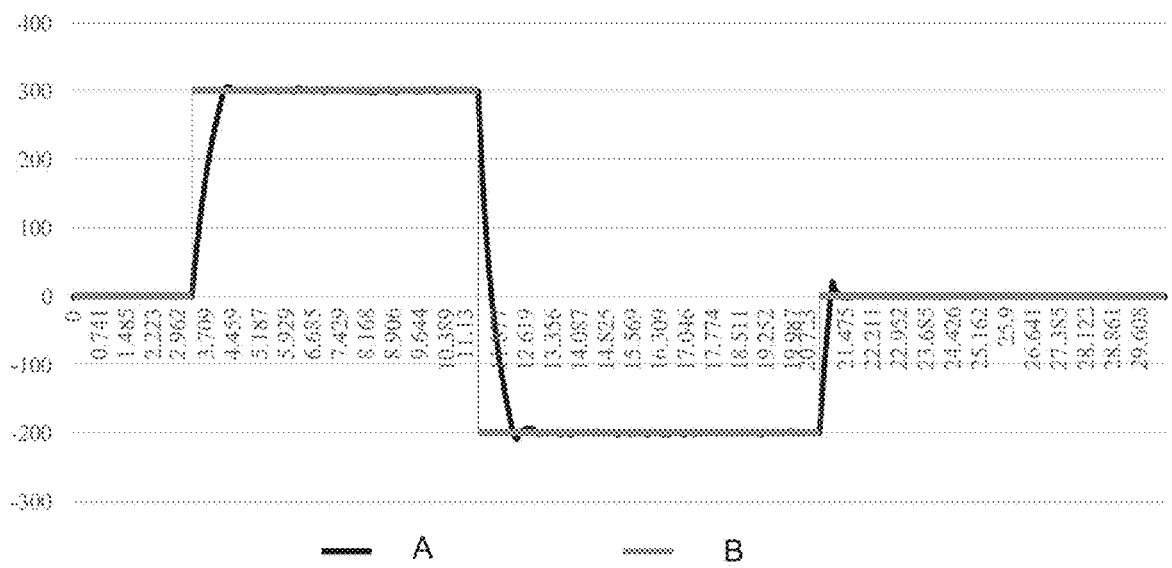
FIG. 8 shows examples of the pressure response A of the embodiment of FIGS. 1A-1B and, in response to an input B as target pressure. The pressure at the main inlet/outlet of the apparatus can be read on the Y-axis and the time (in s) can be read on the X-axis.

An experimental set-up was composed of a full-bridge configuration. This full-bridge configuration was set to a command of 300 mbar and then-200 mbar. FIG. 8 shows examples of pressure response A in response to an input B as target pressure. The unit on the Y axis is mbar.

Example 3

The two above mentioned set-ups of half and full-bridge were tested in comparison. An algorithm was used to drive the air pump and the bimodal valve allowing pressure regulation. Data was sent to a computer for logging and post processing.

Figure 9:
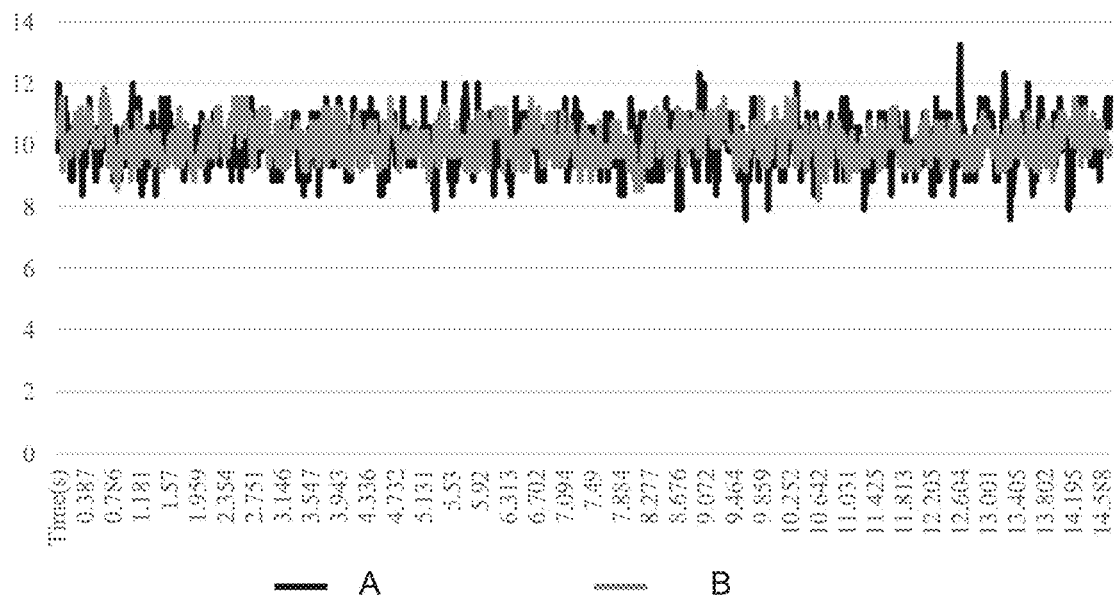
FIG. 9 shows a comparison of the pressure stability A of the embodiment of FIG. 1A and the pressure stability B of the embodiment of FIG. 5C in response to a constant pressure as input target. The pressure at the main inlet/outlet of the apparatus can be read on the Y-axis and the time (in s) can be read on the X-axis.

FIG. 9 shows pressure stability at low pressures where constant low positive pressure order (<5% Full Scale) was applied for the full-bridge configuration A and half-bridge configuration B. The unit on the Y axis is mbar. Both configurations showed a low level of noise in the pressure. The half-bridge configuration showed slightly less oscillation due to a higher working regime of the pumps.

Figure 10:
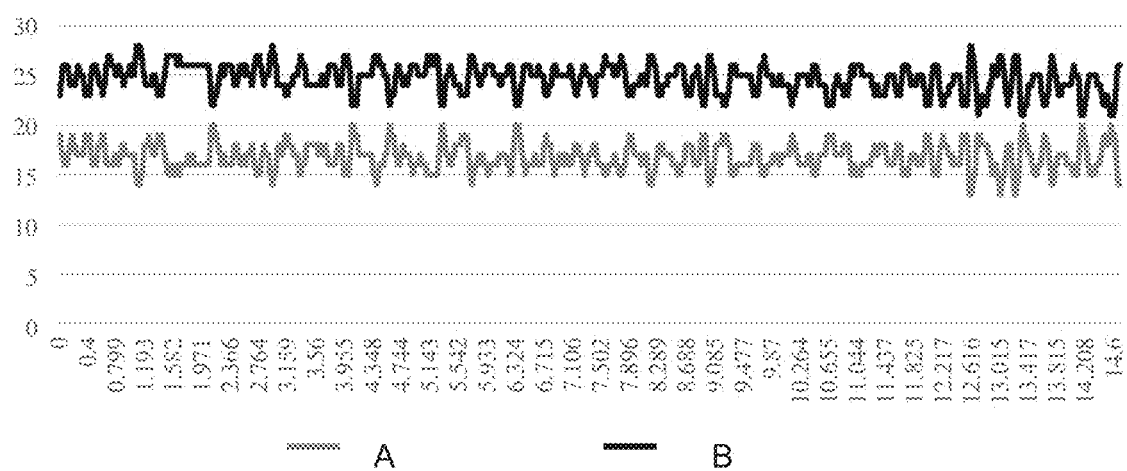
FIG. 10 shows an example of pump power command concerning the pressure response B in FIG. 9, comprising the power command A of the negative pump (i.e., the pump which provides the negative pressure) and power command B of the positive pump (i.e., the pump which provides positive pressure). The power command can be read on the Y-axis and the time (in s) can be read on the X-axis.
Figure 11:
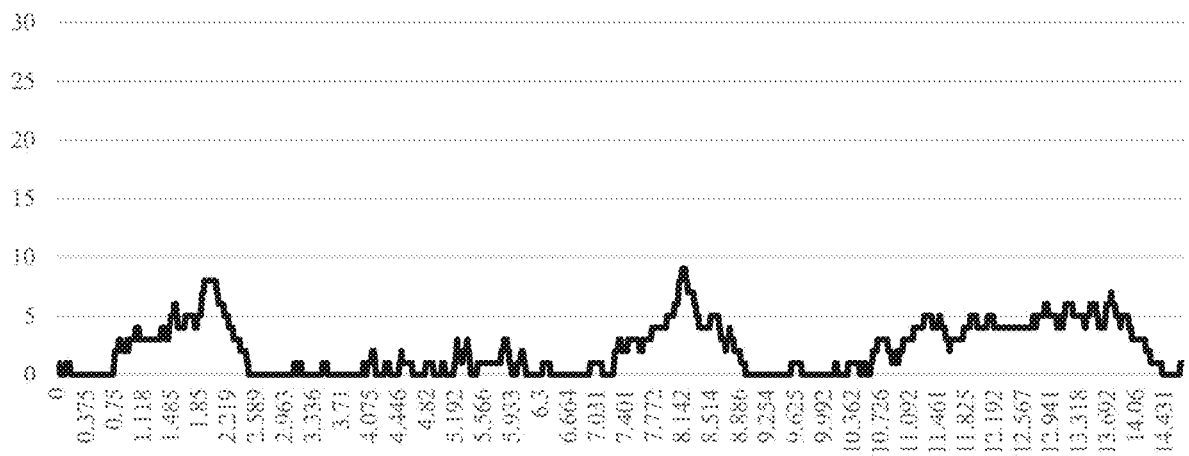
FIG. 11 shows an example of pump power command concerning the pressure response A in FIG. 9. The power command of the pump can be read on the Y-axis and the time (in s) can be read on the X-axis.

FIG. 10 and FIG. 11 are graphs showing pump power command for the half and full-bridge configurations, respectively. The unit on the Y axis is mW. FIG. 10 shows the negative pump (i.e., the pump which produces vacuum) power command A and the positive pump (i.e., the pump which produces positive pressure) B. FIG. 11 shows the pump power command. The pump is derived at very low command, just for maintaining constant pressure, compensating for its internal leak. As exposed in FIG. 9 the half-bridge noise level is lower at a higher working regime of the pumps. Additionally, compared to the actual state of the art where pumps are derived at a constant rate, generally above system needs, here the pumps are accurately derived in order to reach and maintain the pressure setpoint. The overall efficiency is very high since there is no (full-bridge) or very low (half-bridge) wasted air.

Figure 12:
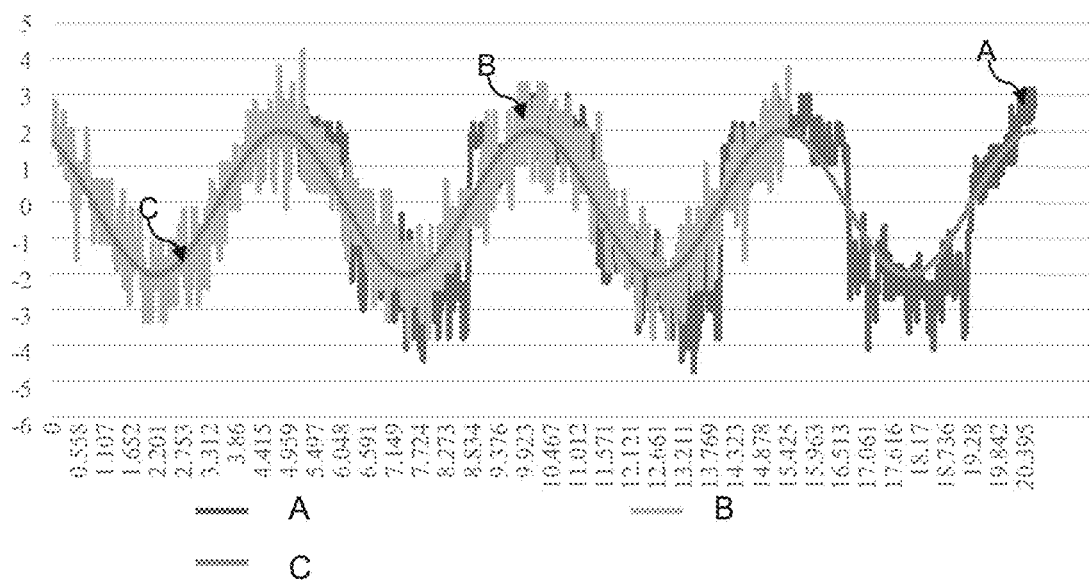
FIG. 12 shows examples of the pressure response A of the embodiment of FIGS. 1A-1B and the pressure response B of the embodiment of FIGS. 5A-5C to a sinusoidal waveform C command. The time (in s) is indicated on the X-axis. The pressure (in mbar) is indicated on the Y-axis.

A sinusoidal waveform excitation command near atmospheric pressure (i.e., zero pressure) was sent as a pressure setpoint. On FIG. 12 the measured pressure of the full-bridge array A and the half-bridge array B over time as a response to the sinusoidal waveform command C (dotted line) are plotted. The unit on the Y axis is mbar.

The above experiments show that the half-bridge configuration using two pumps (one for positive pressure and one for negative pressure) allows a more versatile solution with better performance. A full-bridge set-up using controlled valves allows switching between positive and vacuum generation in real time from a single pump.

If proportional valves are used, full and half-bridge set-ups also benefit from the advantages of controlled leakage. This is a very complete solution for check valve-based pumps improvement for precise pressure regulated applications.

Where half-bridge configuration presents all technological benefits and allow both pressure and vacuum generation the set-up is the most expensive by requiring two pumps and two valves. Full-bridge configuration brings almost all the benefits from the half-bridge with at lower cost. The size can also be reduced even more by using different valve types such as 2-positions/3-way valves. This solution is the most effective and balanced between overall cost, size and performance.

What is claimed is:

1. An apparatus for controlling pressure or flow in a fluidic system, wherein the fluidic system is a microfluidic or nanofluidic system, the apparatus comprising:
    a main inlet/outlet being configured to be fluidically connected to the fluidic system or to a reservoir of fluid connected to said fluidic system;
    a uni-directional pumping device configured to pump gas from an inlet of the uni-directional pumping device to an outlet of the uni-directional pumping device;
    a valves array; and
    a control unit configured to control the valves array and the pumping device;
    wherein the control unit is configured to set the valves array into at least two states comprising:
    a first state in which a first gas source is fluidically connected to the inlet of the uni-directional pumping device, and the outlet of the uni-directional pumping device is fluidically connected to the main inlet/outlet; and
    a second state in which the main inlet/outlet is fluidically connected to the inlet of the pumping device, and the outlet of the pumping device is fluidically connected to a second gas source.

2. The apparatus of claim 1, wherein
    in the first state, the outlet of the uni-directional pumping device is further fluidically connected to the second gas source; and/or
    in the second state, the inlet of the uni-directional pumping device is further fluidically connected to the first gas source.

3. The apparatus of claim 1, wherein the first gas source and the second gas source are a common gas source.

4. The apparatus of claim 1, wherein the valves array comprises:
    a first valve configured to be arranged between the first gas source and the inlet of the uni-directional pumping device;
    a second valve configured to be arranged between the inlet of the uni-directional pumping device and the main inlet/outlet;
    a third valve configured to be arranged between the outlet of the uni-directional pumping device and the main inlet/outlet;
    a fourth valve configured to be arranged between the outlet of the uni-directional pumping device and the second gas source;
    and wherein the first valve, second valve, third valve and fourth valve are bi-directional valves.

5. The apparatus of claim 4, wherein at least one of the bi-directional valves is an on/off valve.

6. The apparatus of claim 3, wherein at least one of the bi-directional valves is a continuously controllable valve.

7. The apparatus of claim 1, wherein the valves array comprises a first valve and a second valve which are both three ways-two positions valves comprising a common port and two switchable ports, and
    the common port of the first valve is configured to be fluidically connected to the inlet of the uni-directional pumping device;
    the two switchable ports of the first valve are configured to be fluidically connected to the first gas source and the main inlet/outlet;
    the common port of the second valve is configured to be fluidically connected to the outlet of the uni-directional pumping device; and
    the two switchable ports of the second valve are configured to be fluidically connected to the second gas source and the main inlet/outlet.

8. The apparatus of claim 1, wherein the valves array comprises one four ways-two positions valve.

9. The apparatus of claim 1, further comprising a continuously controllable valve configured to be arranged between the main inlet/outlet and a third gas source.

10. The apparatus of claim 1, wherein the uni-directional pumping device comprises one or more piezoelectric pumps and/or one or more piston pumps and/or one or more peristaltic pumps and/or one or more turbine pumps.

11. The apparatus of claim 1, wherein the control unit is further configured to control one or more of flow or pressure delivered by the pumping device.

12. An assembly comprising:
    the apparatus of claim 1; and
    a fluidic system which is a microfluidic or nanofluidic system, the fluidic system being fluidically connected to the main inlet/outlet of the apparatus, or
    a reservoir of fluid and a fluidic system which is a microfluidic or nanofluidic system, the reservoir being fluidically connected to the main inlet/outlet of the apparatus and the fluidic system being fluidically connected to the reservoir.

13. A method of controlling pressure or flow in a fluidic system, wherein said fluidic system is a microfluidic or nanofluidic system, wherein said fluidic system is fluidically connected to the main inlet/outlet of an apparatus comprising
    a main inlet/outlet being configured to be fluidically connected to the fluidic system or to a reservoir of fluid connected to said fluidic system;
    a uni-directional pumping device configured to pump gas from an inlet of the uni-directional pumping device to an outlet of the uni-directional pumping device;
    a valves array; and
    a control unit configured to control the valves array and the pumping device;
    wherein the control unit is configured to set the valves array into at least two states comprising:

a first state in which a first gas source is fluidically connected to the inlet of the uni-directional pumping device, and the outlet of the uni-directional pumping device is fluidically connected to the main inlet/outlet; and a second state in which the main inlet/outlet is fluidically connected to the inlet of the pumping device, and the outlet of the pumping device is fluidically connected to a second gas source, the method comprising adjusting one or more of said uni-directional pumping device, and said valves array.

14. The method of claim 13, comprising:

simultaneously flowing gas from the first gas source across the uni-directional pumping device to both the main inlet/outlet and the second gas source; or simultaneously flowing gas from both the first gas source and the main inlet/outlet across the uni-directional pumping device to the second gas source.

15. A non-transitory computer readable storage medium having stored thereon instructions that, when executed, cause at least one control unit to carry out the method of claim 13.

16. The apparatus of claim 3, wherein the common gas source is the atmosphere.

17. The apparatus of claim 4, wherein the first valve and the fourth valve are continuously controllable valves.

18. The apparatus of claim 9, wherein the third gas source, the first gas source and/or the second gas source are a common gas source.

19. The apparatus of claim 9, wherein the continuously controllable valve is configured to be controlled by the control unit.

20. The apparatus of claim 10, wherein the uni-directional pumping device comprises a single piezoelectric pump, piston pump, peristaltic pump, or turbine pump.

* * * * *